US012370706B1

(12) United States Patent
Zeng

(10) Patent No.: US 12,370,706 B1
(45) Date of Patent: Jul. 29, 2025

(54) MULTIFUNCTIONAL SEX TOY WITH RAZOR STRUCTURE

(71) Applicant: Qingwu Zeng, Mianyang (CN)

(72) Inventor: Qingwu Zeng, Mianyang (CN)

( * ) Notice: Subject to any disclaimer, the term of this patent is extended or adjusted under 35 U.S.C. 154(b) by 0 days.

(21) Appl. No.: 18/894,535

(22) Filed: Sep. 24, 2024

(51) Int. Cl.

| | |
|---|---|
| ***B26B 19/48*** | (2006.01) |
| ***A61H 19/00*** | (2006.01) |
| ***A61H 23/02*** | (2006.01) |
| ***B26B 19/14*** | (2006.01) |
| ***B26B 19/28*** | (2006.01) |

(52) U.S. Cl.

CPC ............ *B26B 19/48* (2013.01); *A61H 19/30* (2013.01); *A61H 23/0254* (2013.01); *B26B 19/14* (2013.01); *B26B 19/28* (2013.01); *A61H 2201/0153* (2013.01)

(58) Field of Classification Search

CPC .................... A61H 19/00–50; B26B 19/00–48

USPC ............................................................ 600/38

See application file for complete search history.

(56) References Cited

U.S. PATENT DOCUMENTS

| | | | |
|---|---|---|---|
| 8,308,631 B2 | 11/2012 | Kobashikawa et al. | |
| 2013/0199348 A1* | 8/2013 | Aberizk ............ | A61N 1/36034 30/34.2 |
| 2020/0094424 A1* | 3/2020 | Chan ....................... | B26B 19/28 |
| 2024/0252394 A1* | 8/2024 | Lyles ................. | B26B 19/3873 |

* cited by examiner

*Primary Examiner* — Valerie L Woodward
*Assistant Examiner* — Paige Kathleen Bugg
(74) *Attorney, Agent, or Firm* — Ying-Ting Chen; Law Office of Michael Chen

(57) ABSTRACT

A multifunctional sex toy with razor structure may include a vibration mechanism, a razor mechanism and a handheld mechanism, wherein the razor mechanism comprises a razor driver, a transmission component and a razor component, one end of the transmission component is connected to the razor driver, and the other end is connected to the razor component. The razor driver is started to drive the transmission component, further to drive the razor component to rotate to shave the hair on the body surface, thereby solving the problem that it is inconvenient for users to carry multiple products such as sex toys and razor tools at the same time.

8 Claims, 6 Drawing Sheets

MULTIFUNCTIONAL SEX TOY WITH RAZOR STRUCTURE

FIELD OF THE INVENTION

The invention relates to the technical field of adult toys, in particular to a multifunctional sex toy with razor structure.

BACKGROUND OF THE INVENTION

The working principles of the sex toys for women currently on the market are mostly based on the combination of physical stimulation and sensory experience. Specifically, these products act on women's sensitive areas by simulating or enhancing sexual stimulation, such as vibration, rotation, pulse and other methods, in order to achieve the effects of promoting blood circulation, enhancing sexual pleasure, and relieving stress.

However, while enjoying the pleasant experience brought by women's products, personal hygiene and comfort are equally important, especially when using toys that directly contacted with skin. The presence of body hair may affect the comfort and even hygiene of the product. For women's sensitive areas, the impact of body hair on product is more significant. The traditional way to deal with this problem is to use other razor tools to process the hair in the area before starting massage.

Therefore, the user needs to be equipped with multiple products such as sex toys and razors at the same time, which is inconvenient for women to carry. Therefore, it is necessary to propose a multifunctional sex toy with razor structure to improve the above problem.

SUMMARY OF THE DISCLOSURE

In order to solve the above problems, the present patent provides a multifunctional sex toy with razor structure.

The present invention provides the following technical solutions:

A multifunctional sex toy with razor structure, comprising a vibration mechanism, a razor mechanism and a handheld mechanism provided between the vibration mechanism and the razor mechanism, wherein the vibration mechanism is used to vibrate and massage the sensitive area of woman;

The razor mechanism includes a razor driver, a transmission component and a razor component, one end of the transmission component is connected to the razor driver, and the other end is connected to the razor component. The transmission component is transmitted by the razor driver to drive the razor component to rotate for shaving the hair on the body surface.

In one embodiment, the razor driver includes a motor and an output shaft, the output end of the motor is connected to one end of the output shaft, and the other end of the output shaft is connected to the transmission component.

In one embodiment, the transmission component includes a transmission shaft, one end of the transmission shaft forms a rectangular end, the other end of the output shaft is provided with a rectangular clamping slot matched with the rectangular end, and the rectangular end is clamped and installed in the rectangular clamping slot;

The positioning protrusions are provided on the outer side of the rectangular end, and a transmission positioning hole matched with the positioning protrusion is opened on the side wall of the rectangular clamping slot. The positioning protrusion is inserted into the transmission positioning hole to improve the connection stability of the output shaft driving the transmission shaft to rotate.

In one embodiment, the razor component includes a razor base and a razor main frame, the other end of the transmission shaft forms a rhombic end head, one end of the razor base is provided with a rhombic clamping groove that matches with the rhombic end head, and the rhombic end head is installed in the rhombic clamping groove, so that the transmission shaft drives the razor base and the razor main frame to rotate.

In one embodiment, the razor main frame includes a frame bottom plate, and a plurality of blades arranged at equal intervals around the circumference of the frame bottom plate;

A sleeve hole is provided on the frame bottom plate, and a spring limiting groove matched with the sleeve hole is provided on the razor base, the frame bottom plate is sleeved in the spring limiting groove, so that the razor base drives the frame bottom plate and the plurality of blades to rotate for shaving.

In one embodiment, the transmission component further includes a reset spring provided in the rectangular clamping slot, and one end of the reset spring abuts against the bottom of the rectangular clamping slot;

A spring limiting groove is provided at the end of the rectangular end, and the other end of the reset spring is installed in the spring limiting groove. The reset spring is used to drive the transmission shaft and the razor component to perform telescopic and resetting action.

In one embodiment, the handheld mechanism includes a toy main body, and a first partition, a second partition and a third partition are provided in the toy main body, and a first cavity is formed between the first partition and the second partition, and a second cavity is formed between the second partition and the third partition. The first cavity is used to place the output shaft and one end of a transmission shaft, and the second cavity is used to install the motor.

In one embodiment, the transmission component also includes a transmission sleeve sleeved on one end of the toy main body, a fourth partition is provided in the transmission sleeve, and a first sleeve cavity is formed. The first sleeve cavity is matched with the toy main body, and the fourth partition is arranged in contact with the first partition, and the middle part of the transmission shaft passes through the first partition and the second partition in sequence.

In one embodiment, the transmission component further includes a waterproof plate provided between the first partition and the fourth partition, the waterproof plate is sleeved on the transmission shaft, and a side of the waterproof plate away from the first partition is protruded to form a waterproof ring;

A waterproof clamping groove is provided on one side of the first partition close to the waterproof plate, and a waterproof clamping hole is provided on the fourth partition. One side of the waterproof plate is clamped and installed in the waterproof clamping groove, and the other side is clamped and installed in the waterproof clamping hole. The waterproof ring is abutted against the fourth partition, and the waterproof plate is used to isolate water from flowing into the first sleeve cavity.

In one embodiment, the razor component further includes a razor end sleeve and an anti-scratch sleeve, one end of the razor end sleeve is sleeved on the transmission sleeve, and the anti-scratch sleeve is rotatably provided and connected to the other end of the razor end sleeve. A second sleeve cavity is formed between the anti-scratch sleeve, the fourth partition, and the razor end sleeve, and the second sleeve cavity is used to collect hair shaved off the body surface;

The anti-scratch sleeve is arranged on the blade, and the anti-scratch sleeve is used to isolate the blade from the skin.

The beneficial effects of the present invention are: a vibration mechanism is arranged at one end of the handheld mechanism and a razor mechanism is arranged at the other end, wherein the vibration mechanism perform vibration massage on the sensitive areas of women, and in addition, the razor mechanism includes a razor driver, a transmission component and a razor component. The razor driver is started to drive the transmission component, further to drive the razor component to rotate to shave the hair on the body surface, so that the present invention can combine the two functions of vibration massage and shaving body hair in one product, effectively solving the problem that it is inconvenient for users to carry multiple products.

DETAILED DESCRIPTION OF THE PREFERRED EMBODIMENTS

Figure 1:
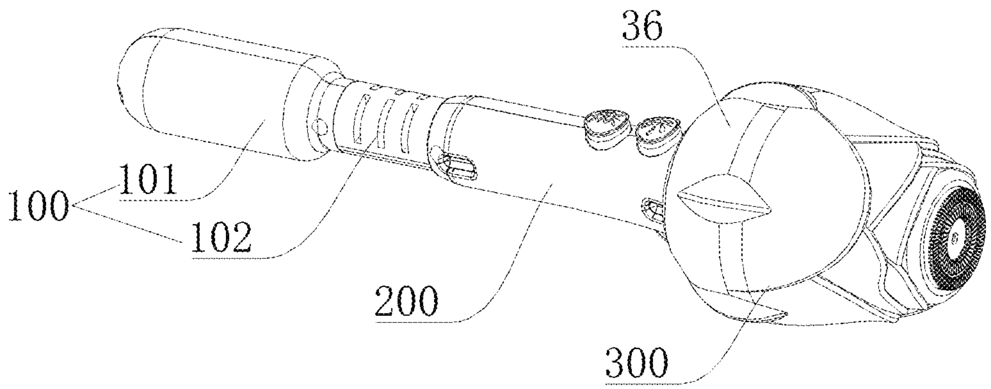
FIG. 1 is a schematic structural view of a multifunctional sex toy with razor structure according to the present invention.

Other features, objects and advantages of the present invention will be more clearly and completely by the detailed description of the non-limiting embodiments with reference to the attached drawings (FIG. 1 to FIG. 6).

Referring to FIGS. 1-6, the present invention proposes a multifunctional sex toy with razor structure, which specifically includes a vibration mechanism 100, a razor mechanism 300, and a handheld mechanism 200 provided therebetween, wherein the vibration mechanism 100 is fixedly connected to the handheld mechanism 200. Specifically, the vibration mechanism 100 includes a vibration component 101 and a flexible connection component 102, one end of the flexible connection component 102 is fixedly connected to the handheld mechanism 200, and the other end is fixedly connected to the vibration component 101. The vibration component 101 can generate a vibration by itself, and combined with the flexible structure of the flexible connection component 102, the vibration component 101 can vibrate relative to the handheld mechanism 200, thereby massaging the sensitive areas of women through vibration. In addition, the razor mechanism 300 includes a razor driver 10, the transmission component 20 and the razor component 30, one end of the transmission component 20 is connected to the razor driver 10, and the other end is connected to the razor component 30, so that the razor driver 10 is started to drive the transmission component 20, further to drive the razor component to rotate to shave the hair on the body surface, so that one end of the multifunctional sex toy massages the sensitive area through the vibration mechanism 100, and the other end processes the body hair through the cooperation of the razor driver 10, the transmission component 20 and the razor component 30, so that the present invention can combine the two functions of vibration massage and hair shaving in one product. Compared with traditional massage tools and shaving tools in two products, the present invention can effectively solve the problem that users are inconvenient to carry multiple products. At the same time, the functional diversity of the massage tools is increased and the practicality of the product is improved.

In some embodiments, referring to the figures, the razor driver 10 includes a motor 11 and an output shaft 12, the output end of the motor 11 is connected to one end of the output shaft 12, and the other end of the output shaft 12 is connected to the transmission component 20. Specifically, the shape of multifunctional sex toy is similar to a column, and a vibration mechanism 100, a handheld mechanism 200 and a razor mechanism 300 are arranged in sequence, wherein the motor 11 is located at the connection between the handheld mechanism 200 and the razor mechanism 300, and is arranged linearly with the output shaft 12. The linear arrangement can reduce the lateral area of the product, making it easier for users to carry.

Figure 2:
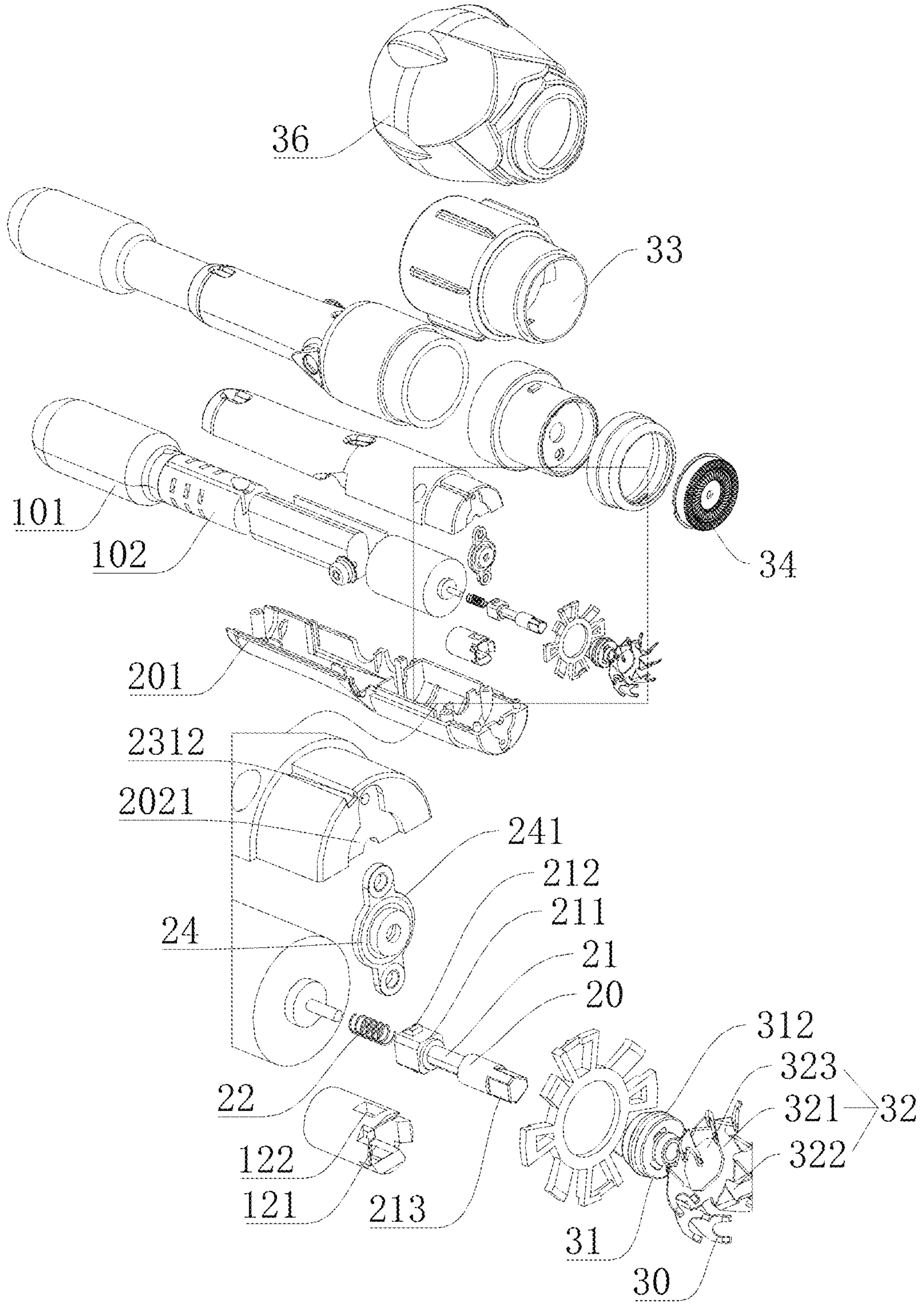
FIG. 2 is an exploded view of a multifunctional sex toy with razor structure according to the present invention.
Figure 3:
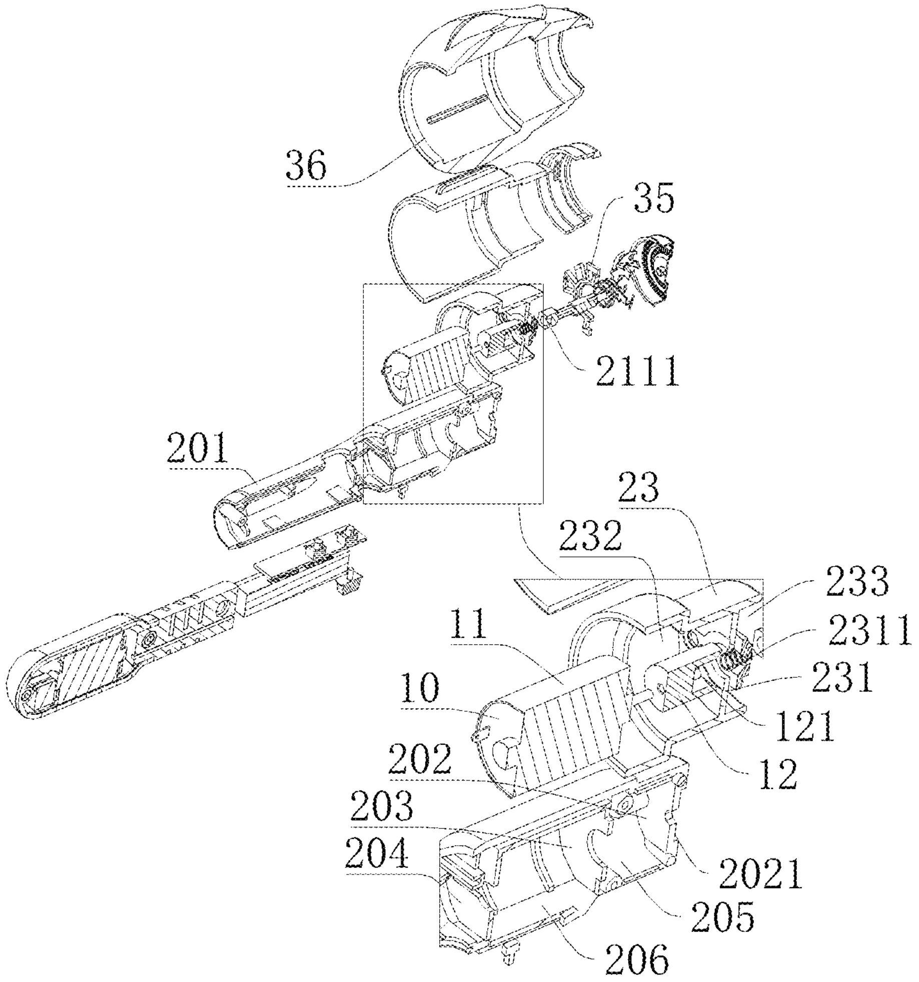
FIG. 3 is a schematic cross-sectional view of a multifunctional sex toy with razor structure according to the present invention.

Further, referring to FIGS. 2-3, the transmission component 20 includes a transmission shaft 21, one end of the transmission shaft 21 forms a rectangular end 211, and the other end of the output shaft 12 is provided with a rectangular clamping slot 121 matched with the rectangular end 211, and the rectangular end 211 is clamped and installed in the rectangular clamping slot 121, wherein the cross section of the rectangular end 211 is rectangular, two positioning protrusions 212 are provided on its peripheral side, and the two positioning protrusions 212 are arranged opposite to each other. In addition, the cross section of the rectangular clamping slot 121 is also rectangular and matched with the rectangular end 211, and a transmission positioning hole 122 matched with the positioning protrusion 212 is provided on the opposite side wall of the rectangular clamping slot 121. When the rectangular end 211 is installed in the rectangular clamping slot 121, the positioning protrusion 212 is inserted into the transmission positioning hole 122. Specifically, the transmission shaft 21 is located in the extension direction of the axes of the motor 11 and the output shaft 12 away from the vibration mechanism 100. Therefore, through rectangular cross-sections of the rectangular clamping slot 121 and the rectangular end 211, the motor 11 drives the transmission shaft 21 to rotate synchronously through the output shaft 12. At the same time, through the structural of the positioning protrusion 212 and the transmission positioning hole, the connection relationship between the transmission shaft 21 and the output shaft 12 perpendicular to the axial direction is enhanced, thereby further improving the connection stability between the output shaft 12 and the transmission shaft 21.

Further, referring to FIGS. 2-3, the razor component includes a razor base 31 and a razor main frame 32, the other end of the transmission shaft 21 forms a rhombic end head 213. One end of the razor base 31 is provided with a rhombic clamping groove 311 that is matched with the rhombic end head 213, the rhombic end head 213 is installed in the rhombic clamping groove 311, so that the transmission shaft 21 drives the razor base 31 and the razor main frame 32 to rotate synchronously.

Further, referring to FIGS. 2-3, the razor main frame 32 includes a frame bottom plate 321, and a plurality of blades 322 arranged at equal intervals around the circumference of the frame bottom plate 321. In addition, a sleeve hole 323 is provided on the frame bottom plate 321, and a spring limiting groove 312 matching the sleeve hole 323 is provided on the razor base 31. The frame bottom plate 321 is sleeved in the spring limiting groove 312, so that the razor base 31 drives the frame bottom plate 321 and the plurality of blades 322 to rotate for shaving.

Specifically, referring to FIGS. 2-3, the end of the transmission shaft 21 away from the output shaft 12 is provided with a razor base 31 and a razor main frame 32 in sequence, and the cross section of the razor base 31 is circular, wherein the other end of the transmission shaft 21 forms a rhombic end head 213, the cross section of the rhombic end head 213 is approximately triangular, a rhombic clamping groove 311 is provided on the side of razor base 31 close to the transmission shaft 21, the cross section of the rhombic clamping groove 311 is also approximately triangular, in this way, the other end of the transmission shaft 21 is fixedly connected to the razor base 31 through structure of the rhombic end head 213 and the rhombic clamping groove 311. So that the transmission shaft 21 can drive the razor base 31 to rotate synchronously around the axis of the motor 11. In addition, the frame bottom plate 321 is in the shape of a circular ring, with a sleeve hole 323 in the middle, and a spring limiting groove 312 along the side of the razor base 31, so that the frame bottom plate 321 is sleeved on the razor base 31. In addition, a plurality of blades 322 are arranged at equal intervals along the outer edge of the peripheral side of the razor base 31, so that when the razor base 31 rotates, the blades 322 are driven to rotate for shaving the body hair.

Further, referring to FIGS. 2-3, the transmission component 20 also includes a reset spring 22 provided in the rectangular clamping slot 121, one end of the reset spring 22 abuts against the bottom of the rectangular clamping slot 121, a spring limiting groove 2111 is provided at the end of the rectangular end 211, and the other end of the reset spring 22 is installed in the spring limiting groove 2111. The reset spring 22 is used to drive the transmission shaft 21 and the razor component to perform telescopic and resetting action. Specifically, the depth of the rectangular clamping slot 121 is greater than the axial length of the rectangular end 211, and the length of the transmission positioning hole 122 in the axial direction of the motor 11 is greater than the length of the positioning protrusion 212 in the axial direction of the motor 11, that is, when the transmission shaft 21 receives a driving force in the direction of the motor 11, the transmission shaft 21 can drive the rectangular end 211 to move in the rectangular clamping slot 121 in the direction of the motor 11, and at the same time drive the positioning protrusion 212 to move the same distance in the transmission positioning hole 122 in the direction of the motor 11, so that when the blade 322 is close to the skin on the body surface, it can move away from the body surface in the direction close to the motor 11, thereby reducing the scratching of the skin surface by the blade 322. In addition, through the structural of the reset spring 22, when the driving force that pushes the transmission shaft 21 to move in the direction of the motor 11 is withdrawn, it can be reset with the help of the elastic force generated by the compression of the spring.

Preferably, the depth of the rectangular clamping slot 121 is greater than the length of the transmission positioning hole 122 in the axial direction of the motor 11, so that the positioning protrusion 212 can abut against the side of the transmission positioning hole 122 close to the motor 11 during the movement of the transmission shaft 21, thereby limiting the movement of the transmission shaft 21 and further controlling the moving distance of the blade 322, ensuring that the blade 322 can shave hair while being away from the skin.

Further, referring to FIGS. 2-3, the handheld mechanism 200 includes a toy main body 201, and a first partition 202, a second partition 203, and a third partition 204 are sequentially arranged in the toy main body 201, a first cavity 205 is formed between the first partition 202 and the second partition 203, a second cavity 206 is formed between the second partition 203 and the third partition 204, wherein the first cavity 205 is used to install the output shaft 12 and the one end of the transmission shaft 21, that is, the first cavity 205 is equivalent to the connecting cavity of the output shaft 12 and the transmission shaft 21, and in addition, the second cavity 206 is used to fix the motor 11 in position, and by separating the motor from the transmission structure, it can effectively prevent the inertia caused by the breaking of the transmission structure from driving the small parts to cause damage to the motor, thereby improving the connection safety of the product structure.

Further, referring to FIGS. 2-3, the transmission component 20 also includes a transmission sleeve 23 sleeved on one end of the toy main body 201, and a fourth partition is provided in the transmission sleeve 23, the fourth partition 231 divides the transmission sleeve 23 into a first sleeve cavity 232 close to one end of the motor 11, and a second sleeve cavity 233 away from one end of the motor 11, wherein the first sleeve cavity 232 is matched with one end of the toy main body 201, and the fourth partition 231 is arranged in contact with the second partition 203, and the middle part of the transmission shaft 21 passes through the first partition 202 and the second partition 203 in sequence.

Further, referring to FIGS. 2-3, the transmission component 20 also includes a waterproof plate 24 arranged between the first partition 202 and the fourth partition 231, the waterproof plate 24 is sleeved on the transmission shaft 21, and the side of the waterproof plate 24 away from the first partition 202 is protruded to form a waterproof ring 241. In addition, a waterproof clamping groove 2021 is provided on the side of the first partition 202 close to the waterproof plate 24, and a waterproof clamping hole 2311 is provided on the fourth partition 231. One side of the waterproof plate 24 is clamped and installed in the waterproof clamping groove 2021, and the other side is clamped and installed in the waterproof clamping hole 2311, and the waterproof ring 241 is abutted against the fourth partition 231. The waterproof plate 24 is used to isolate water from flowing into the first sleeve cavity 232.

Specifically, referring to FIGS. 2-3, the cross-section of the waterproof plate 24 is approximately in the shape of a lug boss, wherein the base and the protruded portion of the waterproof plate 24 are both sleeved on the middle part of the transmission shaft 21, the base portion of the waterproof plate 24 is clamped and installed into the waterproof clamping groove 2021 of the first partition 202, the protruded portion of the waterproof plate 24 is clamped and installed into the waterproof clamping hole 2311 of the fourth partition 231, and the protruded portion of the waterproof plate 24 isolates the transmission shaft 21 from the fourth partition 231, so that through the structural of the waterproof plate 24, the gaps generated by the structures of the transmission shaft 21, the first partition 202 and the fourth partition 231 are effectively sealed, thereby preventing water from flowing into the first cavity 205 along the transmission shaft 21 when cleaning the razor base 31 and the razor main frame 32, causing water accumulation in the first cavity 205, so the structure of the waterproof plate 24 improves the waterproof performance of the product.

Figure 4:
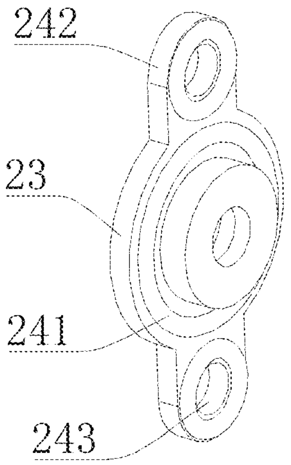
FIG. 4 is a schematic structural view of a waterproof plate of a multifunctional sex toy with razor structure according to the present invention.

Preferably, referring to FIGS. 2-4, connecting ears 242 are provided on opposite sides of the waterproof plate 24, and screw connecting holes 243 are opened on the connecting ears 242, wherein screw fixing holes 2312 matched with the screw connecting holes 243 are opened on the first partition 202 and the fourth partition 231. In addition, a waterproof ring 241 is protruded around the screw connecting hole 243, when the waterproof plate 24 is installed between the first partition 202 and the fourth partition 231, these three are fixed by screws, and the waterproof ring 241 at the side of screw connecting hole 243 is provided in contact with the fourth partition 231 to prevent water directly flowing into first cavity 205 from the screw fixing hole 2312 at the fourth partition 231. At the same time, through the structure of the connecting ear 242, the waterproof plate 24 can be effectively prevented from rotating with the transmission shaft 21, thereby improving the relative position relationship between the waterproof plate 24 and the transmission shaft 21.

Further, referring to FIGS. 2-3 and FIGS. 5-6, the razor component also includes a razor end sleeve 33 and an anti-scratch sleeve 34, one end of the razor end sleeve 33 is sleeved on the transmission sleeve 23, and the anti-scratch sleeve 34 is rotatably provided and connected to the other end of the razor end sleeve 33. A second sleeve cavity 233 is formed between the anti-scratch sleeve 34, the fourth partition 231, and the razor end sleeve 33. The second sleeve cavity 233 is used to collect hair shaved from the body surface. In addition, the anti-scratch sleeve 34 is sleeved on the blade 322, and the anti-scratch sleeve 34 is used to isolate the blade 322 from the skin.

Figure 5:
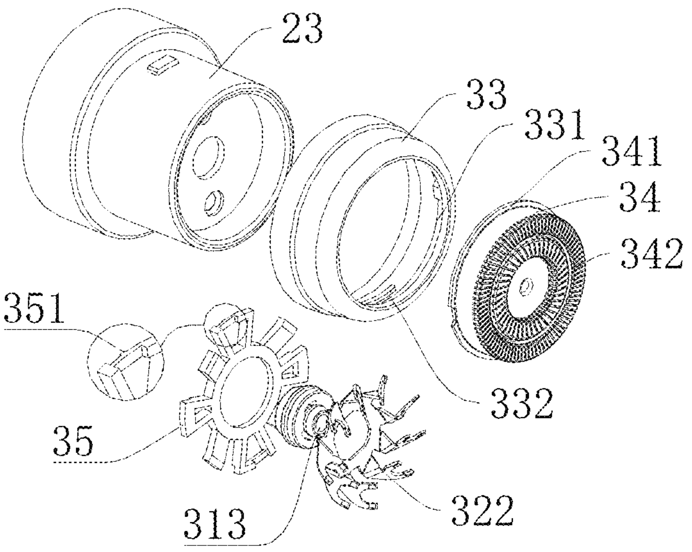
FIG. 5 is a schematic structural view of a razor end sleeve and an anti-scratch sleeve in a multifunctional sex toy with razor structure according to the present invention.
Figure 6:
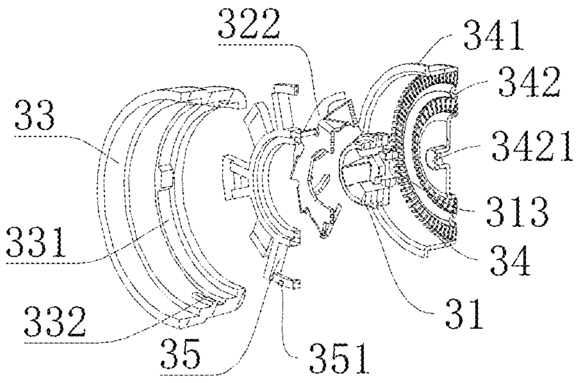
FIG. 6 is a schematic structural view of a razor end sleeve and an anti-scratch sleeve in a multifunctional sex toy with razor structure according to the present invention from another angle.

Specifically, referring to FIGS. 5-6, one end and the middle part of the razor end sleeve 33 are sleeved on the outside of the transmission sleeve 23, and the anti-scratch sleeve 34 is provided on the other end of the razor end sleeve 33, wherein the other end of the razor end sleeve 33 is protruded inwardly at the periphery thereof to form an anti-scratch track 331, and the end of the anti-scratch sleeve 34 close to the razor end sleeve 33 is protruded outwardly to form an anti-scratch convex ring 341 matched with the anti-scratch track 331, thereby the anti-scratch convex ring 341 and the anti-scratch track 331 are connected to each other. Through the structure of anti-scratch track 331 and anti-scratch convex ring 341, the anti-scratch sleeve 34 is clamped and connected with the razor end sleeve 33, and the anti-scratch sleeve 34 is rotatably connected with the other end of the razor end sleeve 33. In addition, a blade grid plate 342 is provided at one end of the anti-scratch sleeve 34 away from the razor end sleeve 33, and the blade grid plate 342 is matched with the blade 322, so that the blade 322 passes through the blade grid plate 342 and contacts the hair on the body surface, thereby facilitating shaving.

It should be noted that, referring to FIGS. 5-6, a limiting protrusion 3421 is provided in the middle of the blade grid plate 342 toward the razor base 31, at the same time, a limiting circular groove 313 matched with the limiting protrusion 3421 is provided on the razor base 31. Therefore, when the blade 322 drives the anti-scratch sleeve 34 to rotate, the limiting protrusion 3421 is installed in the limiting circular groove 313 to limit the rotation anti-scratch sleeve 34, thereby avoiding the anti-scratch sleeve 34 from being displaced in the rotating state.

Preferably, referring to FIGS. 2-3 and 5-6, the razor end sleeve 33 and the anti-scratch sleeve 34 are both made of soft rubber material, such as rubber. In addition, the razor component also includes a support plate 35 made of soft rubber, which is located in the razor end sleeve 33 and is provided on one side of the anti-scratch track 331. The support plate 35 is sleeved on the razor base 31, and the support plate 35 is rotatably connected to the razor base 31. Specifically, a fixed clamping groove 332 is provided on the inner wall of the razor end sleeve 33, a fixed protrusion 351 matched with the fixed clamping groove 332 is provided on the outer edge of the support plate 35, the support plate 35 is fixedly connected to the razor end sleeve 33 through the structure of the fixed protrusion 351 and the fixed clamping groove 332, so that the razor end sleeve 33 is supported in shape through the structure of the support plate 35. At the same time, the razor end sleeve 33, the support plate 35, and the anti-scratch sleeve 34 are all made of soft rubber material, which makes it easier to manually installation of the anti-scratch sleeve 34 and convenient for cleaning the broken hair collected in the second sleeve cavity 233.

In some embodiments, referring to FIGS. 1-6, the razor component further includes a decorative sleeve 36 sleeved on the razor end sleeve 33. The decorative sleeve 36 is approximately in the shape of a flower, which can improve the aesthetics of the product.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

The invention claimed is:

1. A multifunctional sex toy with razor structure, comprising: a vibration mechanism, a razor mechanism and a handheld mechanism provided between the vibration mechanism and the razor mechanism, wherein the vibration mechanism is configured to vibrate and massage to provide sexual stimulation to a woman's sensitive area; the razor mechanism includes a razor driver, a transmission component and a razor component, one end of the transmission component is connected to the razor driver, and an opposite end is connected to the razor component; the transmission component is configured to be transmitted by the razor driver to drive the razor component to rotate for shaving hair on a body surface, wherein the razor driver includes a motor and an output shaft, an output end of the motor is connected to one end of the output shaft, and an opposite end of the output shaft is connected to the transmission component, wherein the transmission component further comprises a transmission shaft and positioning protrusions; one end of the transmission shaft forms a rectangular end, an opposite end of the output shaft is provided with a rectangular clamping slot matched with the rectangular end, and the rectangular end is configured to be clamped and installed in the rectangular clamping slot, wherein the positioning protrusions are provided on an outer side of the rectangular end, and a transmission positioning hole matched with the positioning protrusion is opened on a side wall of the rectangular clamping slot, and the positioning protrusion is configured to be inserted into the transmission positioning hole to improve the connection stability of the output shaft when driving the transmission shaft to rotate.

2. The multifunctional sex toy with razor structure according to claim 1, the razor component further comprising a razor base and a razor main frame, an opposite end of the transmission shaft forms a rhombic end head, one end of the razor base is provided with a rhombic clamping groove matched with the rhombic end head, the rhombic end head is installed in the rhombic clamping groove, so that the transmission shaft is configured to drive the razor base and the razor main frame to rotate.

3. The multifunctional sex toy with razor structure according to claim 2, the razor main frame further comprising a frame bottom plate, a plurality of blades arranged at equal intervals around a circumference of the frame bottom plate, and a sleeve hole on the frame bottom plate, and a spring limiting groove matched with the sleeve hole on the razor base; the frame bottom plate is sleeved in the spring limiting groove, so that the razor base is configured to drive the frame bottom plate and the plurality of blades to rotate for shaving.

4. The multifunctional sex toy with razor structure according to claim 3, the transmission component further comprising a reset spring and a second spring limiting groove, wherein the reset spring is in the rectangular clamping slot, one end of the reset spring abuts against a bottom of the rectangular clamping slot; and the second spring limiting groove is located at an end of the rectangular end, and an opposite end of the reset spring is installed in the second spring limiting groove; the reset spring is used to drive the transmission shaft and the razor component to perform telescopic and resetting action.

5. The multifunctional sex toy with razor structure according to claim 4, the handheld mechanism further comprising a toy main body, a first partition, a second partition and a third partition each provided in the toy main body, and a first cavity is formed between the first partition and the second partition, and a second cavity is formed between the second partition and the third partition; said first cavity is used to install the output shaft and one end of the transmission shaft, and the second cavity is used to install the motor.

6. The multifunctional sex toy with razor structure according to claim 5, the transmission component further comprising a transmission sleeve sleeved on one end of the toy main body, a fourth partition is provided in the transmission sleeve, and a first sleeve cavity is formed; wherein the first sleeve cavity is matched with the toy main body, and the fourth partition is provided in contact with the first partition, and a middle part of the transmission shaft is configured to pass through the first partition and the second partition in sequence.

7. The multifunctional sex toy with razor structure according to claim 6, wherein the transmission component further comprises a waterproof plate and a waterproof clamping groove; wherein the waterproof plate is located between the first partition and the fourth partition, the waterproof plate is sleeved on the transmission shaft, and a side of the waterproof plate disposed away from the first partition is protruded to form a waterproof ring;

wherein the waterproof clamping groove is provided on one side of the first partition close to the waterproof plate, and a waterproof clamping hole is provided on the fourth partition; one side of the waterproof plate is configured to be clamped and installed in the waterproof clamping groove, and an opposite side is configured to be clamped and installed in the waterproof clamping hole; the waterproof ring is abutted against the fourth partition, and the waterproof plate is used to isolate water from flowing into the first sleeve cavity.

8. The multifunctional sex toy with razor structure according to claim 7, the razor component further comprising a razor end sleeve and an anti-scratch sleeve, one end of the razor end sleeve is sleeved on the transmission sleeve, the anti-scratch sleeve is rotatably provided and connected to an opposite end of the razor end sleeve; a second sleeve cavity is formed between the anti-scratch sleeve, the fourth partition, and the razor end sleeve, and the second sleeve cavity is configured to collect hair shaved off the body surface; said anti-scratch sleeve is provided on one of the plurality of blades, and the anti-scratch sleeve is used to isolate the blade from the woman's skin.

* * * * *